United States Patent
Yu et al.

(10) Patent No.: US 7,893,679 B2
(45) Date of Patent: Feb. 22, 2011

(54) PULSE WIDTH MODULATION CONTROLLER, CIRCUIT AND METHOD THEREOF WITH SHORT CIRCUIT PROTECTION

(75) Inventors: Chien Peng Yu, Hsinchu (TW); Yi Cheng Wang, Hsinchu (TW); Ye Hsuan Yan, Hsinchu (TW); Chih Chi Hsu, Hsinchu (TW)

(73) Assignee: Advanced Analog Technology, Inc., Science-Based Industrial Park, Hsinchu (TW)

( * ) Notice: Subject to any disclaimer, the term of this patent is extended or adjusted under 35 U.S.C. 154(b) by 216 days.

(21) Appl. No.: 12/275,379

(22) Filed: Nov. 21, 2008

(65) Prior Publication Data

US 2010/0026266 A1     Feb. 4, 2010

(30) Foreign Application Priority Data

Jul. 31, 2008    (TW)  .............................. 97128942 A (51) Int. Cl.
*G05F 1/00*     (2006.01)

(52) U.S. Cl. ........................................................ 323/285
(58) Field of Classification Search ................. 323/282, 323/284, 285, 288; 361/18
See application file for complete search history.

(56) References Cited

U.S. PATENT DOCUMENTS

2007/0200540 A1 *    8/2007    Hashimoto et al. ........... 323/282

* cited by examiner

*Primary Examiner*—Adolf Berhane
*Assistant Examiner*—Emily Pham
(74) *Attorney, Agent, or Firm*—Winston Hsu; Scott Margo (57) ABSTRACT

A PWM comprises a voltage transformation module, a voltage-sensing module and a timer. The voltage transformation module is configured to transform an input voltage into an output voltage. The voltage-sensing module is coupled to the voltage transformation module and configured to detect a voltage of a first terminal, wherein the voltage of the first terminal is proportional to the output voltage. The timer is configured to measure the time duration for which the voltage of the first terminal is lower than a reference voltage, wherein the timer initiates a short circuit signal when the time duration is greater than a predetermined value.

1 Claim, 9 Drawing Sheets

PULSE WIDTH MODULATION CONTROLLER, CIRCUIT AND METHOD THEREOF WITH SHORT CIRCUIT PROTECTION

BACKGROUND OF THE INVENTION

1. Field of the Invention

The present invention relates to a circuit design, and more particularly, to a short circuit protection of a pulse width modulation (PWM) circuit.

2. Description of the Related Art

Figure 1:
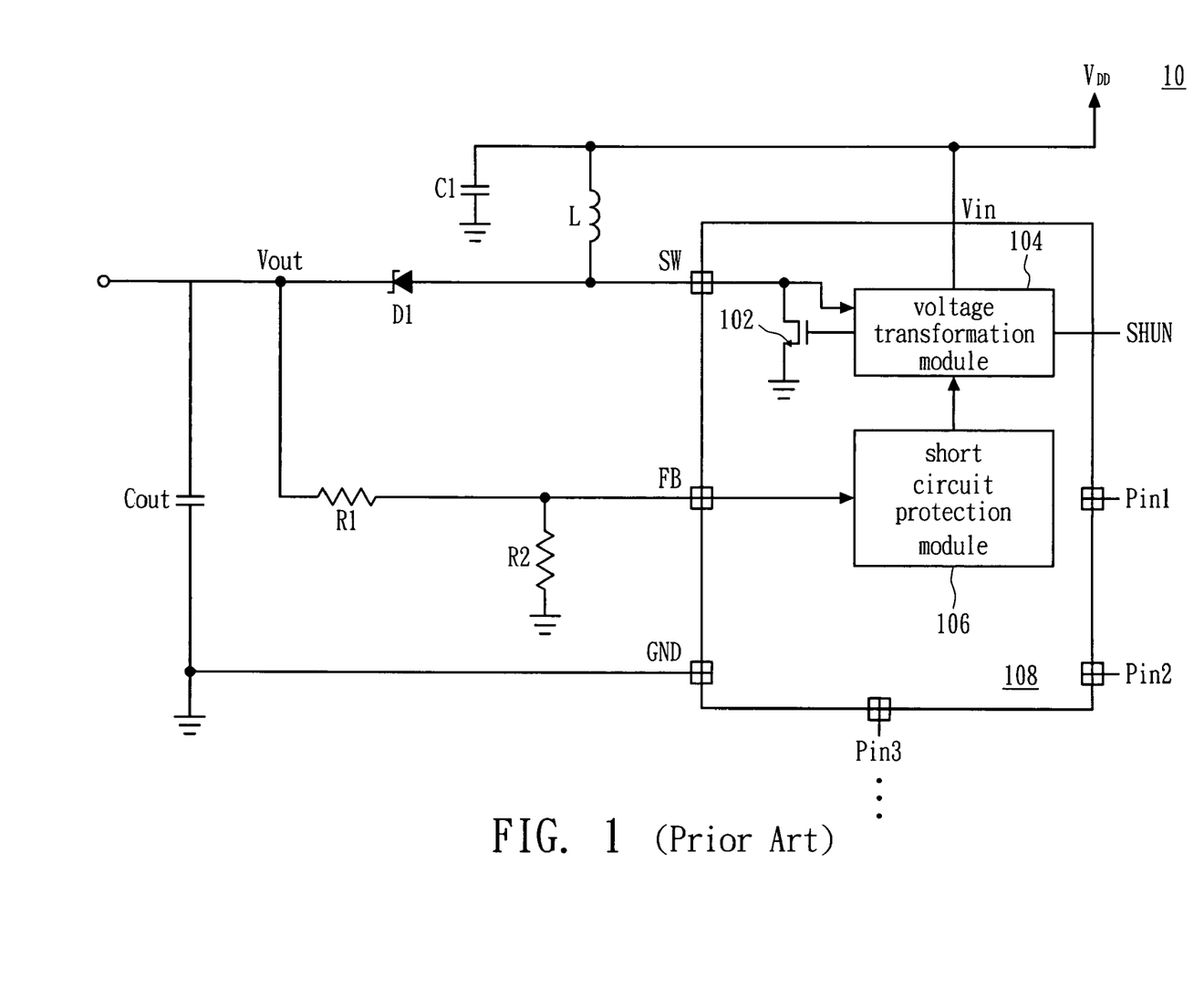
FIG. 1 shows a prior PWM controller applied to a switching regulator.

A PWM controller is usually applied to a switching regulator. As shown in FIG. 1, the PWM controller transforms an input voltage $V_{in}$ into a stable output voltage $V_{out}$.

To prevent the output voltage $V_{out}$ from being accidentally grounded (short circuited), in addition to the voltage transformation module 104 installed inside the PWM controller 108, there is also a short circuit protection design. Generally, the short circuit protection design uses a short circuit protection module 106 to detect a feedback pin FB. When the output voltage $V_{out}$ is in short circuit, the power transistor 102 is turned off, and the off state is forwarded to the voltage transformation module 104 to signal the occurrence of a short circuit. In addition, the sudden voltage drop at the feedback pin FB causes the PWM controller 108 to be temporarily turned off. However, with such type of short circuit protection mechanism, devices in relevant paths and the PWM controller will still be damaged by an overlarge current.

Figure 2:
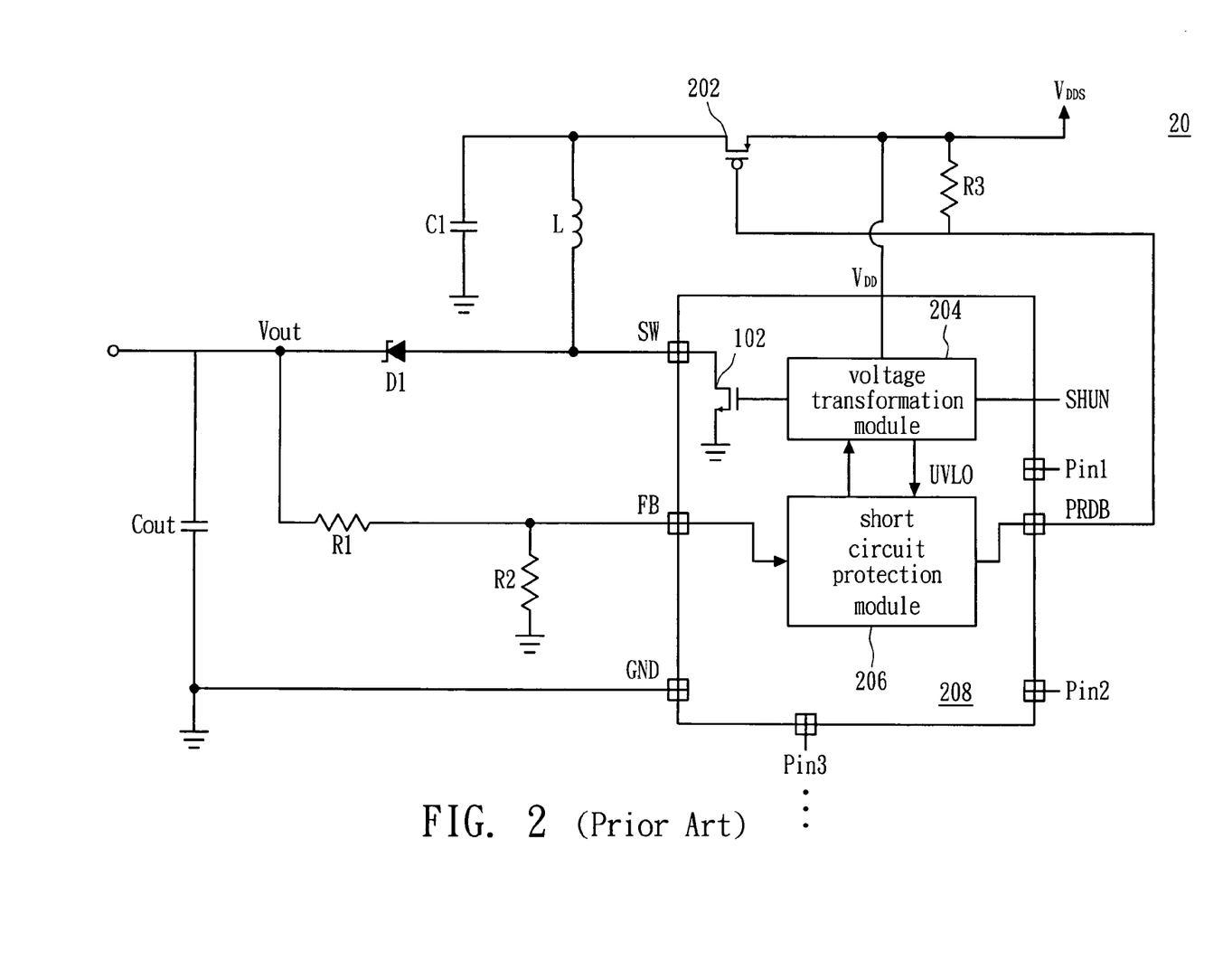
FIG. 2 shows another type of short circuit protection design.

FIG. 2 shows another type of prior art short circuit protection design. In such a design, a P-type MOSFET transistor 202 is used to prevent the system power VDDS from being affected by the output voltage $V_{out}$. In addition, the short circuit protection module 206 also detects an under voltage lock out (UVLO) signal. If the UVLO signal indicates that the input voltage VDD of the PWM controller 208 is too low, a PRDB pin sends out a gate control signal to make the transistor 202 temporarily turn off. However, in this structure when the transistor 202 is set to be turned off, the VDD voltage recovers the original voltage level to disable the indication of the UVLO signal that indicates the input voltage VDD is too low, which causes the PRDB pin to turn the transistor 202 on. The repeated on/off states of the transistor 202 cause the VDDS voltage to fail to remain at a stable voltage level and instead the voltage will follow a triangular waveform until the release of the short circuit of the output voltage $V_{out}$. Furthermore, the short circuit protection mechanism is not initiated upon the initiation stage of the PWM controller. As such, the prior short circuit protection fails to provide full protection to the circuit.

Therefore, there is an important need for a new design of PWM controller to increase the efficiency of the short circuit protection.

SUMMARY OF THE INVENTION

A pulse width modulation (PWM) controller in accordance with one embodiment of the present invention comprises a voltage transformation module, a voltage-sensing module and a timer. The voltage transformation module is configured to transform an input voltage into an output voltage. The voltage-sensing module is coupled to the voltage transformation module and configured to detect a voltage of a first terminal, wherein the voltage of the first terminal is proportional to the output voltage. The timer is configured to measure the time duration for which the voltage of the first terminal is lower than a reference voltage, wherein the timer initiates a short circuit signal when the time duration is greater than a predetermined value.

A method for controlling PWM in accordance with one embodiment of the present invention comprises the steps of: comparing a voltage of a first terminal to a reference voltage; measuring a time duration for which the voltage of the first terminal is lower than the reference voltage; and initiating a short circuit signal to isolate a system power from the first terminal if the time duration exceeds a predetermined value.

BRIEF DESCRIPTION OF THE DRAWINGS

The invention will be described according to the appended drawings in which.

PREFERRED EMBODIMENT OF THE PRESENT INVENTION

Figure 3A:
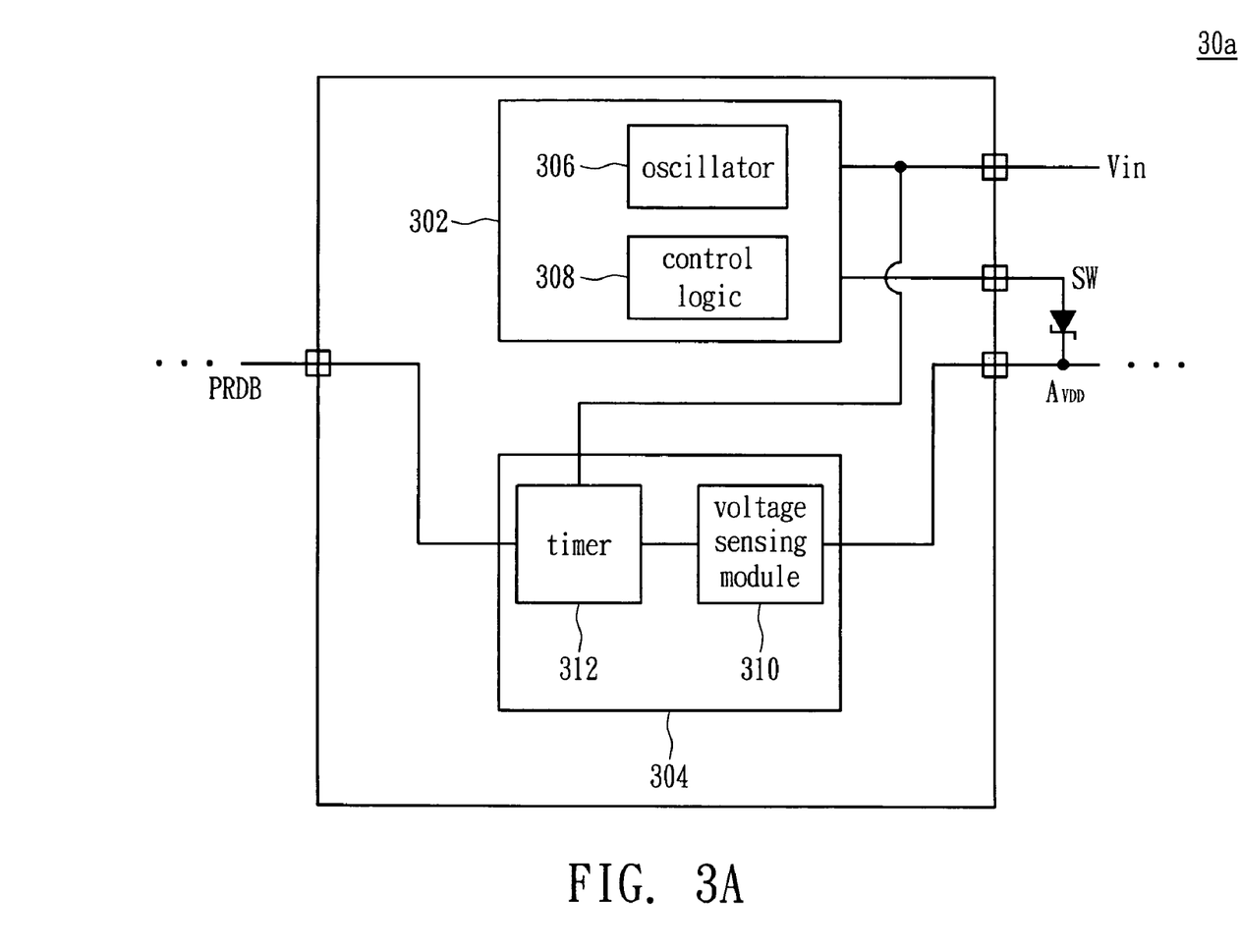
FIGS. 3A and 3B show different block diagrams of a PWM controller in accordance with one embodiment of the present invention.

FIG. 3A shows a block diagram of a PWM controller 30a in accordance with one embodiment of the present invention. The PWM controller 30a includes a voltage transformation module 302 and a short circuit protection module 304. The voltage transformation module 302 includes an oscillator 306 and a control logic 308, and is configured to transform an input voltage $V_{in}$ into an output signal $A_{VDD}$ with a different voltage level. The short circuit protection module 304 includes a voltage-sensing module 310 and a timer 312. The voltage-sensing module 310 is used to detect the voltage AVDD of the first terminal, which is a possible short circuit point. The timer 312 measures the time duration for which the voltage AVDD of the first terminal is lower than a reference voltage $V_{SF}$. When the time duration exceeds a predetermined value $T_{sh}$, a short circuit signal is initiated through a PRDB pin to indicate the first terminal is in a short circuit state. After the short circuit signal is sent, the PWM controller 30a is temporarily turned off to protect the internal modules of the PWM controller 30a and also to avoid outputting unexpected signals due to abnormal external situations.

Figure 3B:
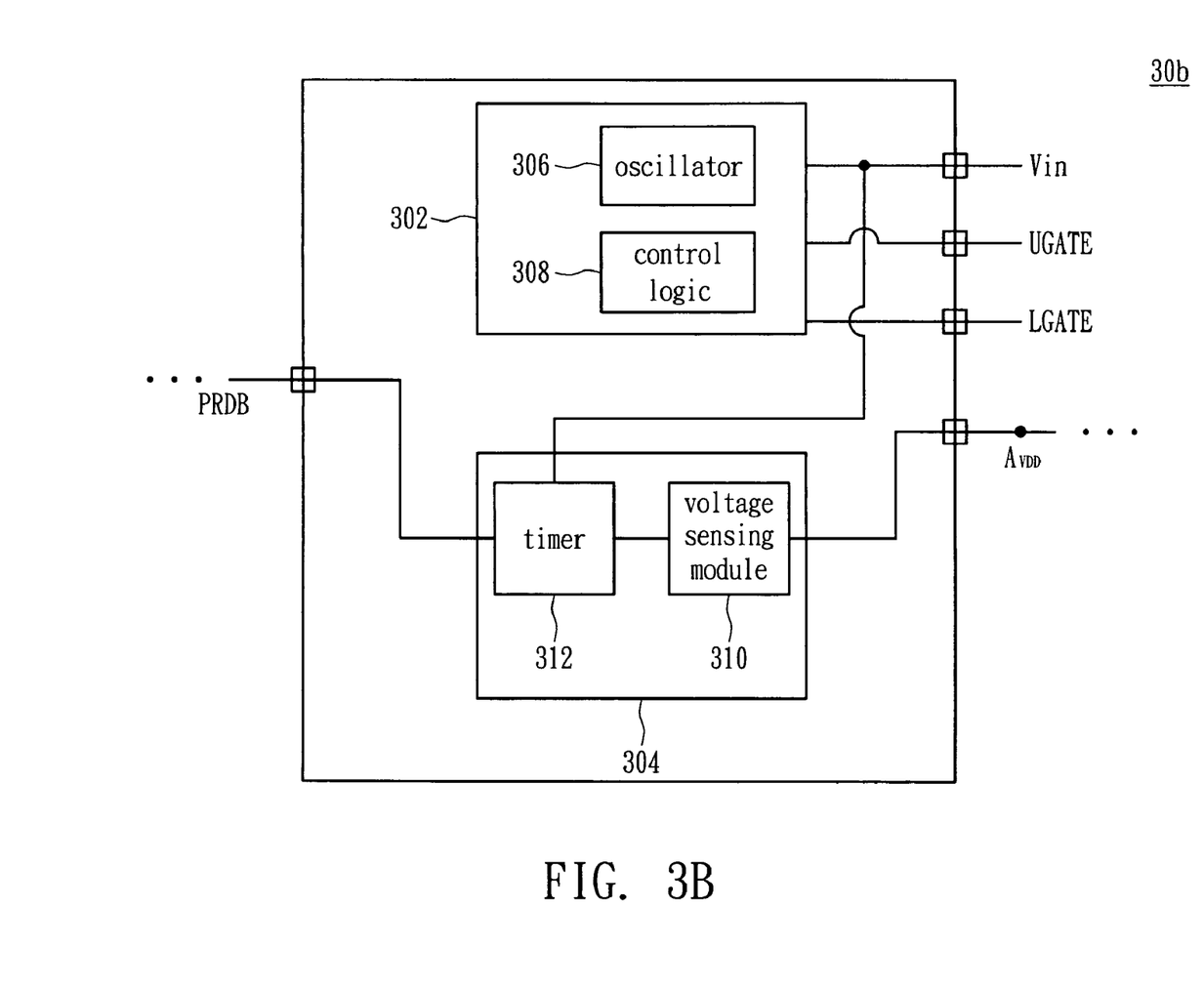

In addition to an asynchronous voltage transformation as shown in FIG. 3A, the PWM controller can also be applied to a synchronous voltage transformation as shown in FIG. 3B. The output signals of the PWM controller 30b in FIG. 3B can be a pair of gate control signals UGATE and LGATE so as to control the upper-part and lower-part transistors in the next stage.

Figure 4:
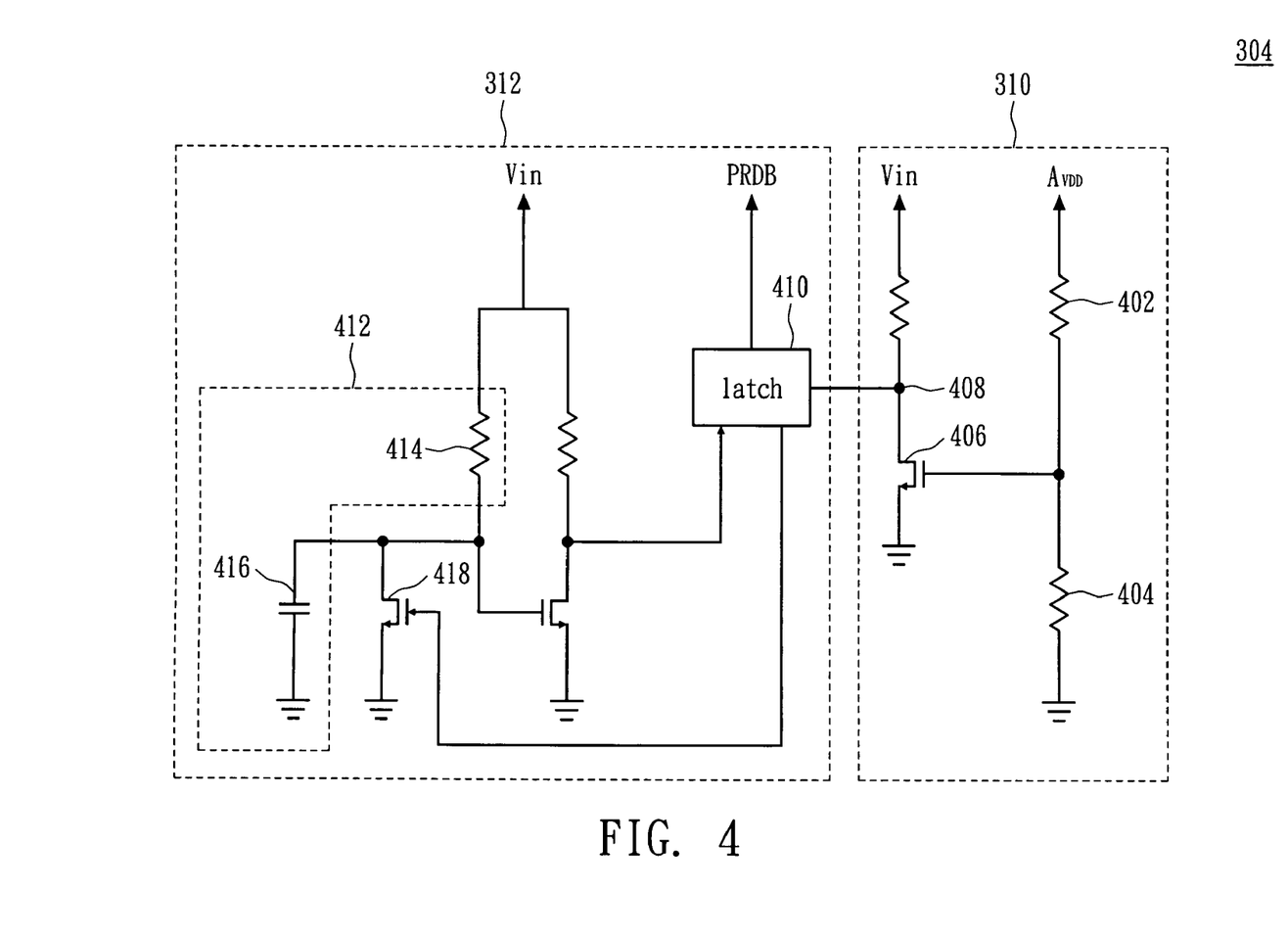
FIG. 4 shows a short circuit protection module in accordance with one embodiment of the present invention.

FIG. 4 shows a short circuit protection module 304 in accordance with one embodiment of the present invention. The voltage-sensing module 310 includes a pair of divided resistors 402, 404 and a transistor 406. The divided resistors 402, 404 divide the voltage AVDD of the first terminal. When the divided voltage is lower than the threshold voltage $V_t$ of the transistor 406, the voltage of the node 408 increases to drive the timer 312. The timer 312 includes a latch 410 and a resistor-capacitor circuit (RC circuit) 412. When the timer 312 receives the driving instruction from the node 408, the capacitor 416 starts to get charged. When the charge of the capacitor 416 exceeds a threshold voltage, the latch 410 initiates the short circuit signal to the PRDB pin, which separates the first terminal from a system power. The transistor 418 is capable of maintaining the capacitor 416 in an uncharging state until the timer 312 is driven.

Figure 5A:
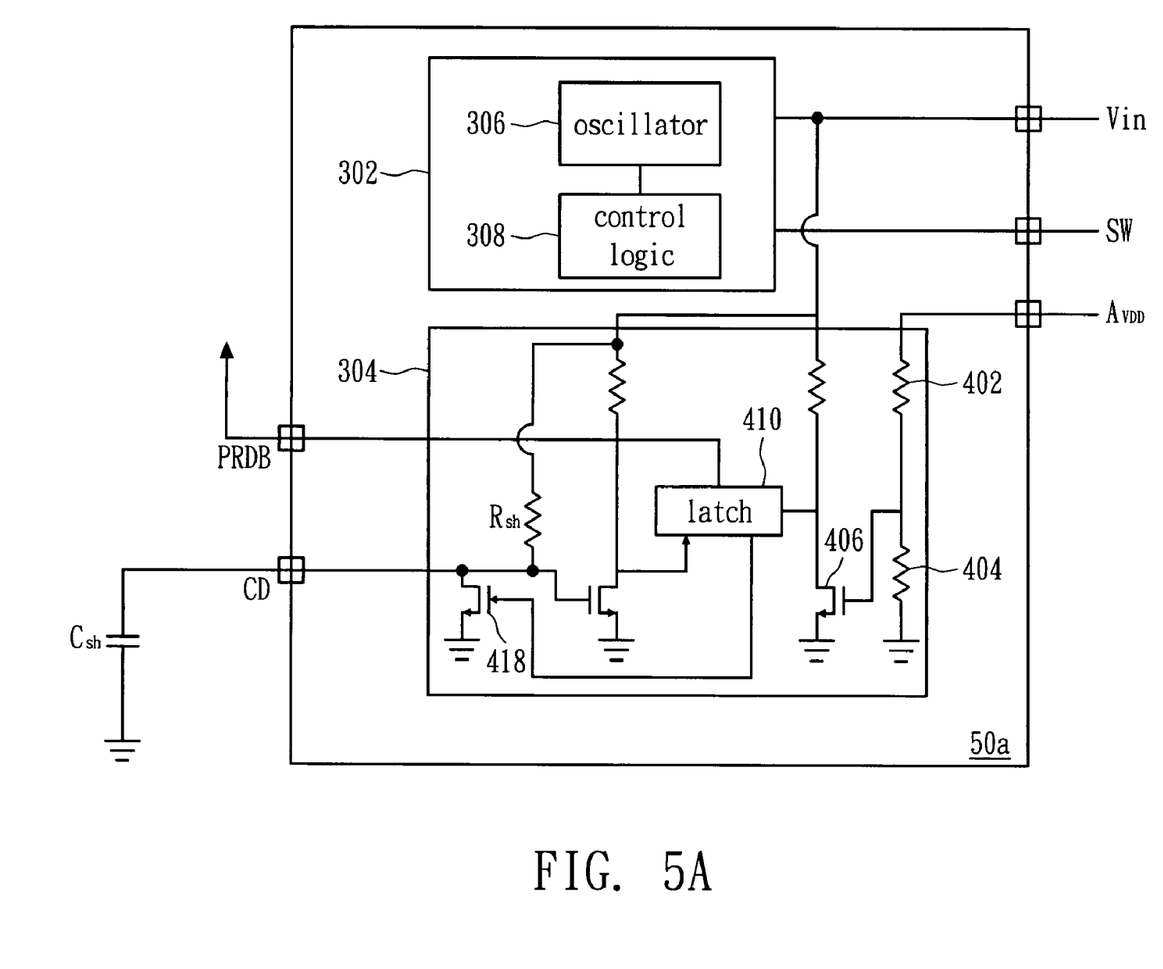
FIGS. 5A and 5B show structural diagrams in which the RC circuit is disposed outside the PWM controller.
Figure 5B:
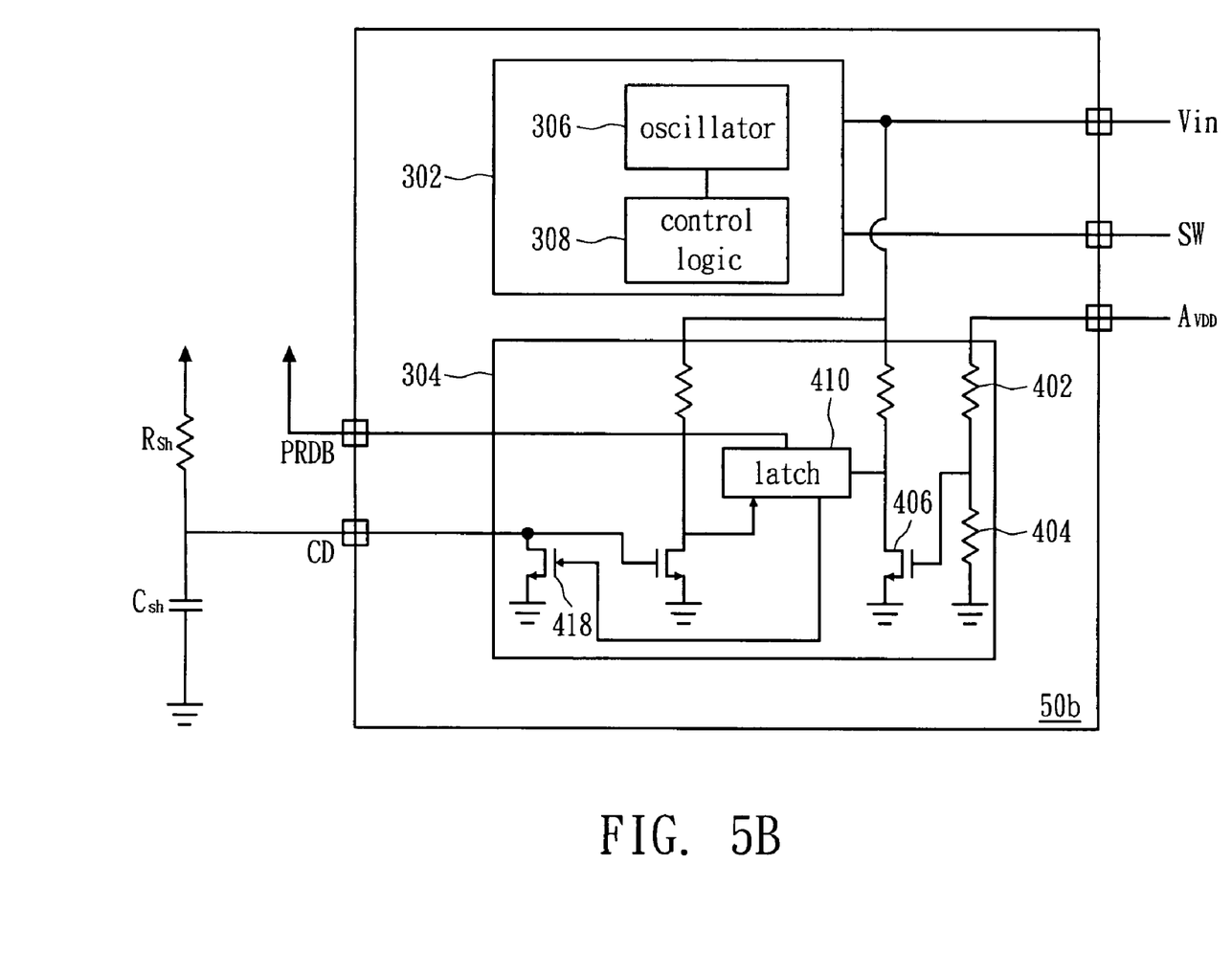

Because the time constant of the RC circuit 412 can control the predetermined threshold duration of the timer 312, in other embodiments of the present invention the RC circuit 412 can be installed outside the PWM controller. FIGS. 5A and 5B show a structural diagram in which the RC circuit is disposed outside the PWM controller. In FIG. 5A, the capacitor $C_{sh}$ outside the PWM controller 50a is coupled to the PWM controller 50a through a CD pin. In FIG. 5B, the capacitor $C_{sh}$ and resistor $R_{sh}$ are installed outside the PWM controller 50b. In such kind of circuit installation, the predetermined time length $T_{sh}$ can be adjusted by changing resistance and capacitance, so the arrangement is flexible.

Figure 6:
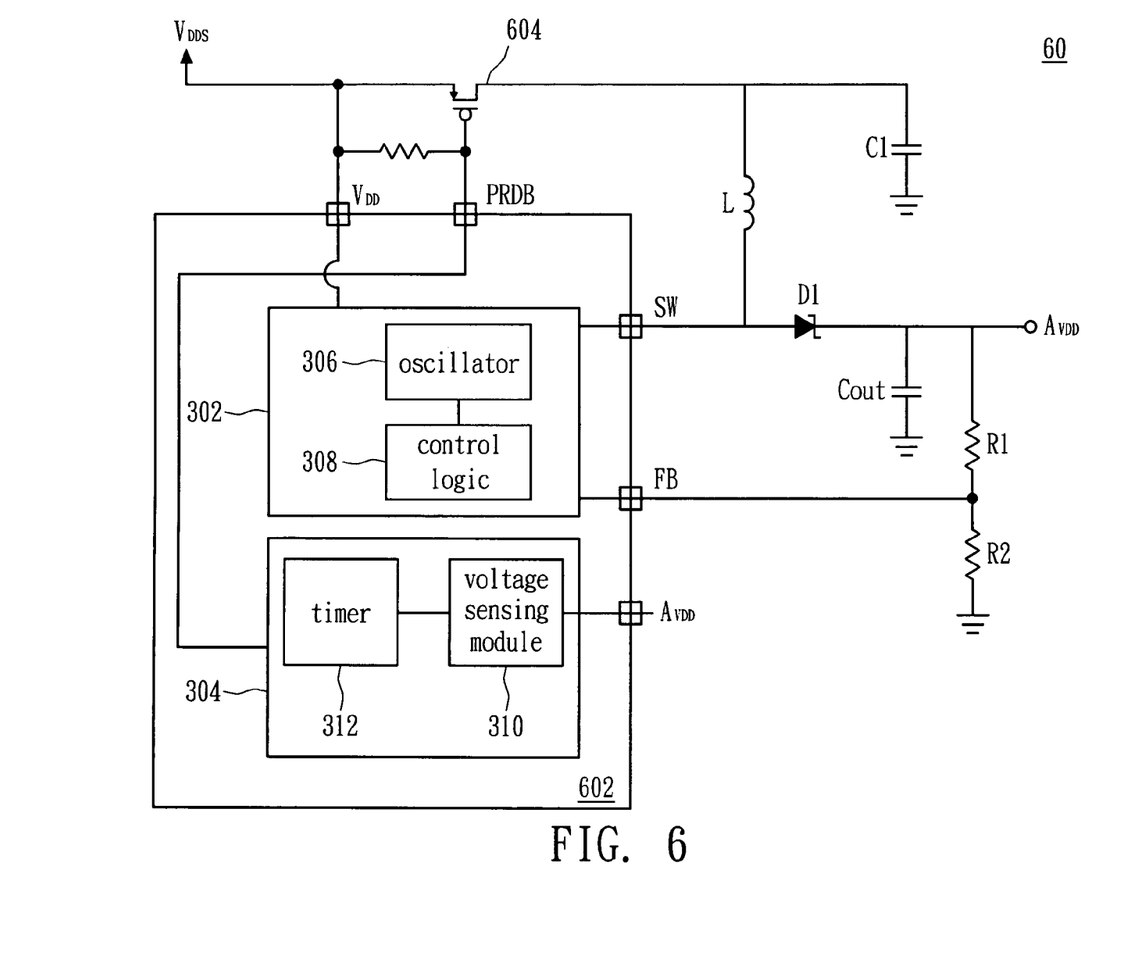
FIG. 6 shows a PWM controller with a part of pins in accordance with one embodiment of the present invention.

FIG. 6 shows a PWM controller 602 with pins in accordance with one embodiment of the present invention. Because the pin assignment of the PWM controller varies according to different applications, the detailed description of pin assignment is omitted. In addition, the recited pin names are used for description and identification in the embodiments, and not intended to limit the application of present invention. The PWM control circuit 60 includes a PWM controller 602, a system power VDDS, a switch 604 and a first terminal AVDD. The first terminal is coupled to the system power VDDS through the switch 604. The switch 604 can be implemented by a P-type MOSFET, and its gate can be controlled by a PRDB pin of the PWM controller 602. When the first terminal AVDD is coupled to a low voltage or is grounded, the PWM controller 602 will measure the time duration for which the voltage AVDD of the first terminal remains at a low voltage level. If the time duration exceeds a predetermined time length $T_{sh}$, the PRDB pin of the PWM controller sends out a short circuit signal to turn off the switch 604 and to cut the connection between the first terminal and the system power VDDS.

Figure 7:
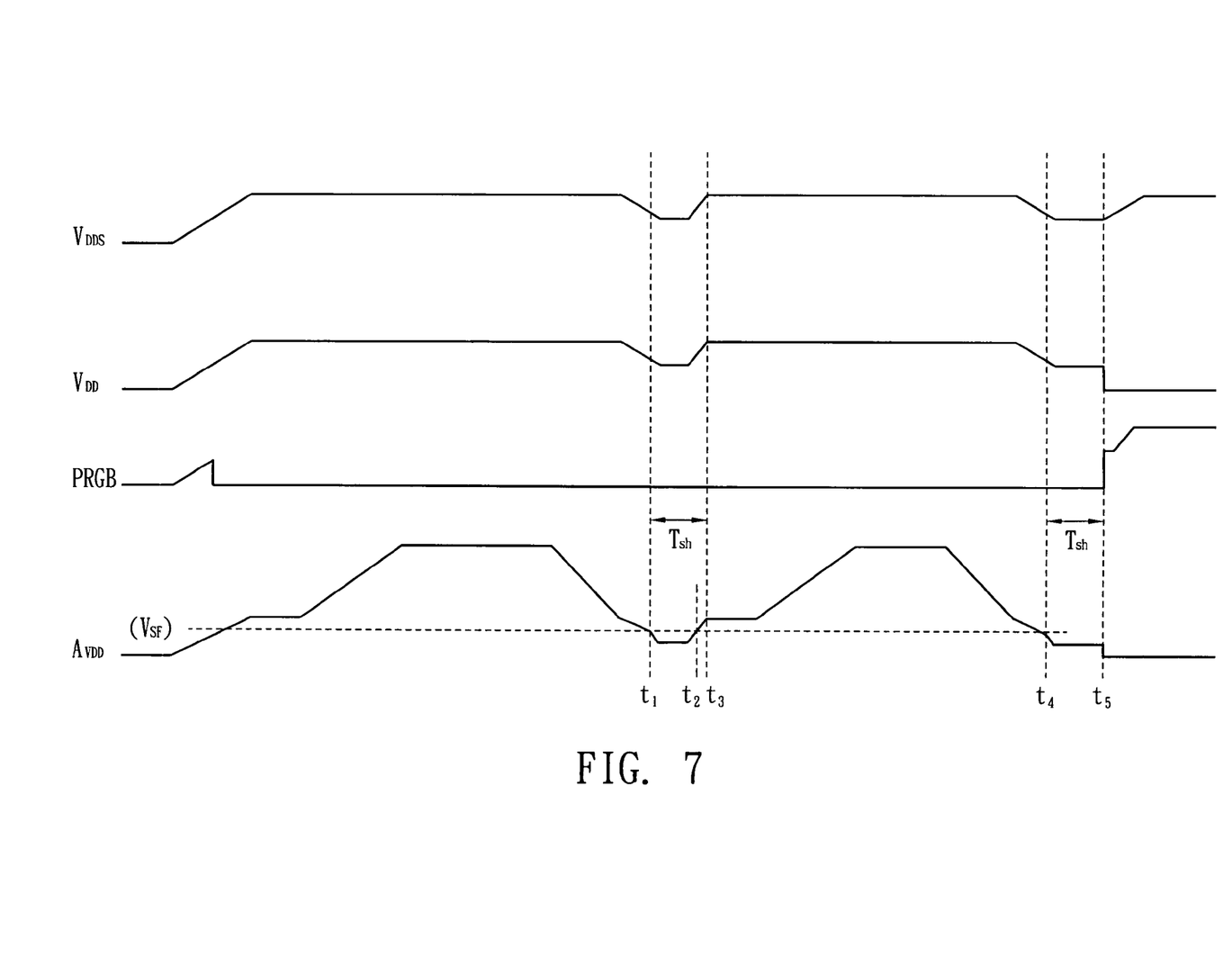
FIG. 7 shows a timing diagram.

FIG. 7 shows a timing diagram of the system power VDDS, input power VDD, pin PRDB and first terminal AVDD. At time $t_1$, the voltage AVDD of the first terminal decreases below the reference voltage $V_{SF}$, which forces the divided voltage of the first terminal below the threshold voltage $V_r$. The result drives the timer to begin measuring the time length $T_{sh}$. At time $t_3$, because the voltage AVDD of the first terminal is not lower than the reference voltage $V_{SF}$, no short circuit signal is sent and pin PRDB remains in a low-voltage state. At time $t_4$, the voltage AVDD of the first terminal being lower than the reference voltage $V_{SF}$ causes the divided voltage of the first terminal to be lower than the threshold voltage $V_r$. At time $t_5$, because the voltage AVDD of the first terminal is still lower than the reference voltage $V_{SF}$, a short circuit signal is sent out and the pin PRDB changes to a low-voltage level to isolate the connection between the system power VDDS and the first terminal.

The above-described embodiments of the present invention are intended to be illustrative only. Numerous alternative embodiments may be devised by persons skilled in the art without departing from the scope of the following claims.

What is claimed is:

1. A pulse width modulation (PWM) controller, comprising:
    a voltage transformation module configured to transform an input voltage into an output voltage;
    a voltage-sensing module coupled to the voltage transformation module and configured to detect a voltage of a first terminal, wherein the voltage of the first terminal is proportional to the output voltage;
    a timer configured to measure the time duration for which the voltage of the first terminal is lower than a reference voltage, wherein the timer initiates a short circuit signal when the time duration is greater than a predetermined value;
    wherein the voltage-sensing module compares a divided voltage of the first terminal to a threshold voltage, and the timer measures the time duration for which the divided voltage is lower than the threshold voltage; and
    wherein the timer includes a resistor-capacitor circuit and a latch; when the divided voltage is lower than the threshold voltage, the latch is activated and a capacitor in the resistor-capacitor circuit is charged, and when the charge of the capacitor exceeds a threshold, the latch initiates the short circuit signal.

* * * * *